(12) United States Patent
Betancourt Santana et al.

(10) Patent No.: US 10,077,790 B2
(45) Date of Patent: Sep. 18, 2018

(54) SPRING CLIP WITH THREE CANTILEVERED BARS AND INTEGRAL 4-WAY LOCATOR

(71) Applicant: FORD GLOBAL TECHNOLOGIES, LLC, Dearborn, MI (US)

(72) Inventors: Gabriela Betancourt Santana, Mexico City (MX); Diego Santillan Gutierrez, Tizayuca (MX); Fernando Paisano Rodriguez, San Andres Cholula (MX); Federico Perez Lecuona, Iztapalapa (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/388,689

(22) Filed: Dec. 22, 2016

(65) Prior Publication Data
US 2018/0180076 A1   Jun. 28, 2018

(51) Int. Cl.
*F16B 2/22* (2006.01)
*B60R 13/00* (2006.01)

(52) U.S. Cl.
CPC ............. *F16B 2/22* (2013.01); *B60R 13/00* (2013.01)

(58) Field of Classification Search
CPC ......... Y10T 24/44026; Y10T 24/45105; B60R 13/00; B60R 13/0206; B60R 2013/0293; F16B 2/22
See application file for complete search history.

(56) References Cited

U.S. PATENT DOCUMENTS

| | | |
|---|---|---|
| 3,015,866 A | 1/1962 | Elms et al. |
| 3,210,032 A | 10/1965 | Van Slyke |
| 3,811,154 A | 5/1974 | Linderman et al. |
| 3,852,849 A | 12/1974 | Pestka |
| 3,889,320 A | 6/1975 | Koscik |
| 3,921,261 A | 11/1975 | Fisher |
| 4,337,774 A | 7/1982 | Perlin |
| 4,619,365 A | 10/1986 | Kelly et al. |
| 4,811,922 A | 3/1989 | Yoneyama |
| 4,927,306 A | 5/1990 | Sato |
| 5,014,952 A | 5/1991 | Petrohilos |
| 5,191,513 A | 3/1993 | Sugiura et al. |
| 5,689,863 A | 11/1997 | Sinozaki |
| 6,012,691 A | 1/2000 | Van Leeuwen et al. |
| 6,079,486 A | 6/2000 | Cennamo et al. |
| 7,036,779 B2 | 5/2006 | Kawaguchi et al. |
| 7,152,281 B2 | 12/2006 | Scroggie |
| 7,320,157 B2 | 1/2008 | Lubera et al. |
| 7,351,023 B2 | 4/2008 | Scroggie et al. |
| 7,354,102 B2 | 4/2008 | Cave et al. |
| 7,549,830 B2 | 6/2009 | Cooley et al. |
| 7,878,749 B2 | 2/2011 | Edland |
| 7,950,115 B2 | 5/2011 | Spitz |
| 8,109,705 B1 | 2/2012 | Brown et al. |
| 8,936,420 B2 | 1/2015 | Scroggie et al. |
| 8,979,460 B2 | 3/2015 | Ostergren |
| 9,079,341 B2 | 7/2015 | Risdale et al. |
| 9,121,426 B2 | 9/2015 | Jagoda |

(Continued)

*Primary Examiner* — Robert John Sandy
(74) *Attorney, Agent, or Firm* — Vichit Chea; King & Schickli, PLLC

(57) ABSTRACT

A spring clip includes a body having a base, a support post carried on the base, three cantilevered bars carried on the support post and a 4-way locator fixed to the base.

19 Claims, 7 Drawing Sheets

(56) References Cited

U.S. PATENT DOCUMENTS

| | | |
|---|---|---|
| 2003/0156917 A1 | 8/2003 | Heflin et al. |
| 2006/0230586 A1 | 10/2006 | Maki et al. |
| 2007/0125004 A1 | 6/2007 | Conner et al. |
| 2007/0125729 A1 | 6/2007 | Krueger |
| 2008/0066266 A1 | 3/2008 | Scroggie et al. |
| 2011/0197405 A1* | 8/2011 | Kato ............... F16B 21/065 24/530 |
| 2012/0257924 A1 | 10/2012 | Andrews |
| 2013/0011188 A1 | 1/2013 | Donnelly |

* cited by examiner

SPRING CLIP WITH THREE CANTILEVERED BARS AND INTEGRAL 4-WAY LOCATOR

TECHNICAL FIELD

This document relates generally to the fastener field and, more particularly, to a new and improved spring clip incorporating three cantilevered bars and an integral 4-way locator. Such a spring clip is particularly useful in automotive applications to connect plastic parts to sheet metal parts.

BACKGROUND

Various types of fasteners including, for example, bolts/nuts, metal clips, plastic clips or the like may be utilized to secure a plastic part to a substrate such as a sheet metal part. Significantly, every added fastener increases the part cost and weight of the assembly. More specifically, fastener usage requires additional operations at the assembly plant or at the plastic part manufacturer and every additional operation increases the required manpower, process cost and production time. In addition, each fastener has a risk of producing squeaks and rattles. Further, added, separate fasteners have the risk of being missing or mismatched during assembly.

This document relates to a new and improved spring clip with three cantilevered bars and an integral 4-way locator. The resulting "spider" spring clip advantageously provides a more efficient means of attachment that meets pull force requirements similar to heat staking while eliminating the necessity of the welding process associated with heat staking and thereby reducing manufacturing costs and time process. The 4-way locator provides extra stiffness to the spring clip and the three cantilevered bars provide a robust and strong joint between parts that virtually eliminates the risk of squeaks and rattles.

Advantageously, the new and improved spring clip may be molded directly into the plastic part and advantageously only requires low insertion efforts while the spring clip locates, locks and retains in a single snapping action.

SUMMARY

In accordance with the purposes and benefits described herein, a new and improved spring clip is provided. That spring clip comprises a body having (a) a base, (b) a support post carried on the base, (c) a first cantilevered bar carried on the support post, (d) a second cantilevered bar carried on the support post, (e) a third cantilevered bar carried on the support post and (f) a 4-way locator fixed to the base adjacent the support post. The first cantilevered bar is opposed to the second cantilevered bar. The third cantilevered bar is opposed to the 4-way locator.

The spring clip may further include a first tunable rib carried on the base adjacent a first distal end of the first cantilevered bar and a second tunable rib carried on the base adjacent a second distal end of the second cantilevered bar. The first distal end may include a first double-blocked notch. Similarly, the second distal end may include a second double blocked notch. Further, the third cantilevered bar may include a third distal end having a third double blocked notch.

The first cantilevered bar may include a first S-curve. The second cantilevered bar may include a second S-curve. Further, the third cantilevered bar may include a third S-curve.

Still further, the first cantilevered bar may include a first gusset. The second cantilevered bar may include a second gusset. Further, the third cantilevered bar may include a third gusset.

The 4-way locator may include a first beveled tuning rib. Further, the 4-way locator may include a second beveled tuning rib. The first beveled tuning rib may also be parallel to the second beveled tuning rib.

Still further, the first double blocked notch may include a first midpoint angle. The second double blocked notch may include a second midpoint angle. The third double blocked notch may include a third midpoint angle.

In the following description, there are shown and described several preferred embodiments of the spring clip. As it should be realized, the spring clip is capable of other, different embodiments and its several details are capable of modification in various, obvious aspects all without departing from the spring clip as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the spring clip and together with the description serve to explain certain principles thereof. In the drawing figures.

Figure 3:
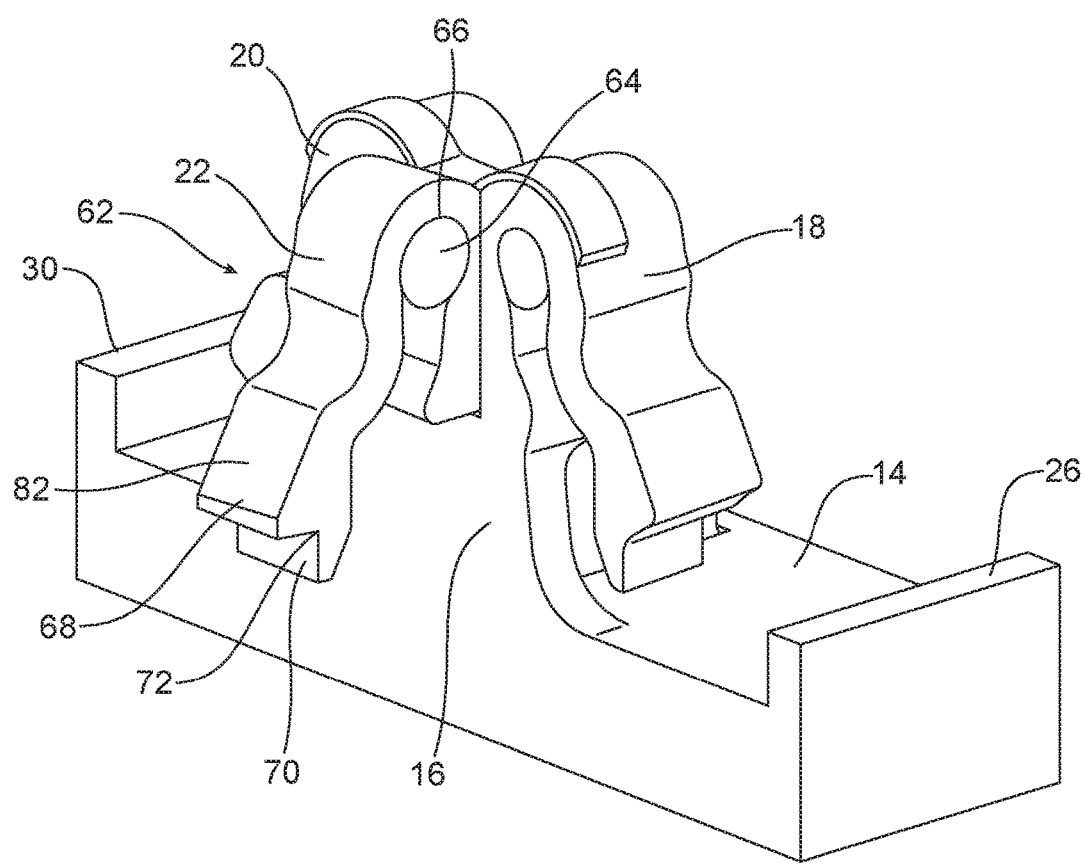
FIG. 3 is a rear perspective view of the spring clip illustrated in FIG. 1 more clearly showing the third cantilevered bar.
Figure 4:
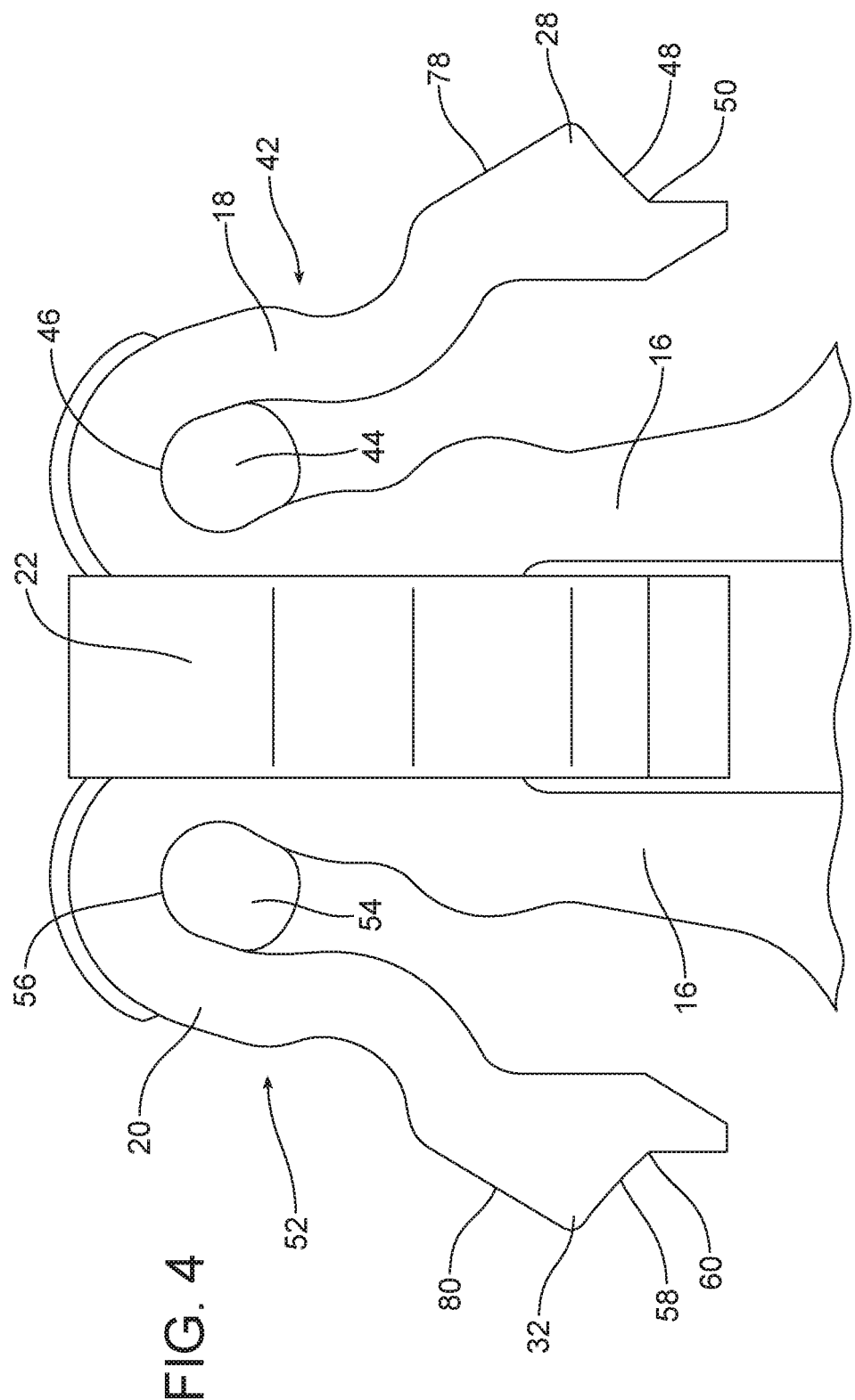
FIG. 4 is a detailed elevational view clearly illustrating the three cantilevered bars of the spring clip.
Figure 5A:
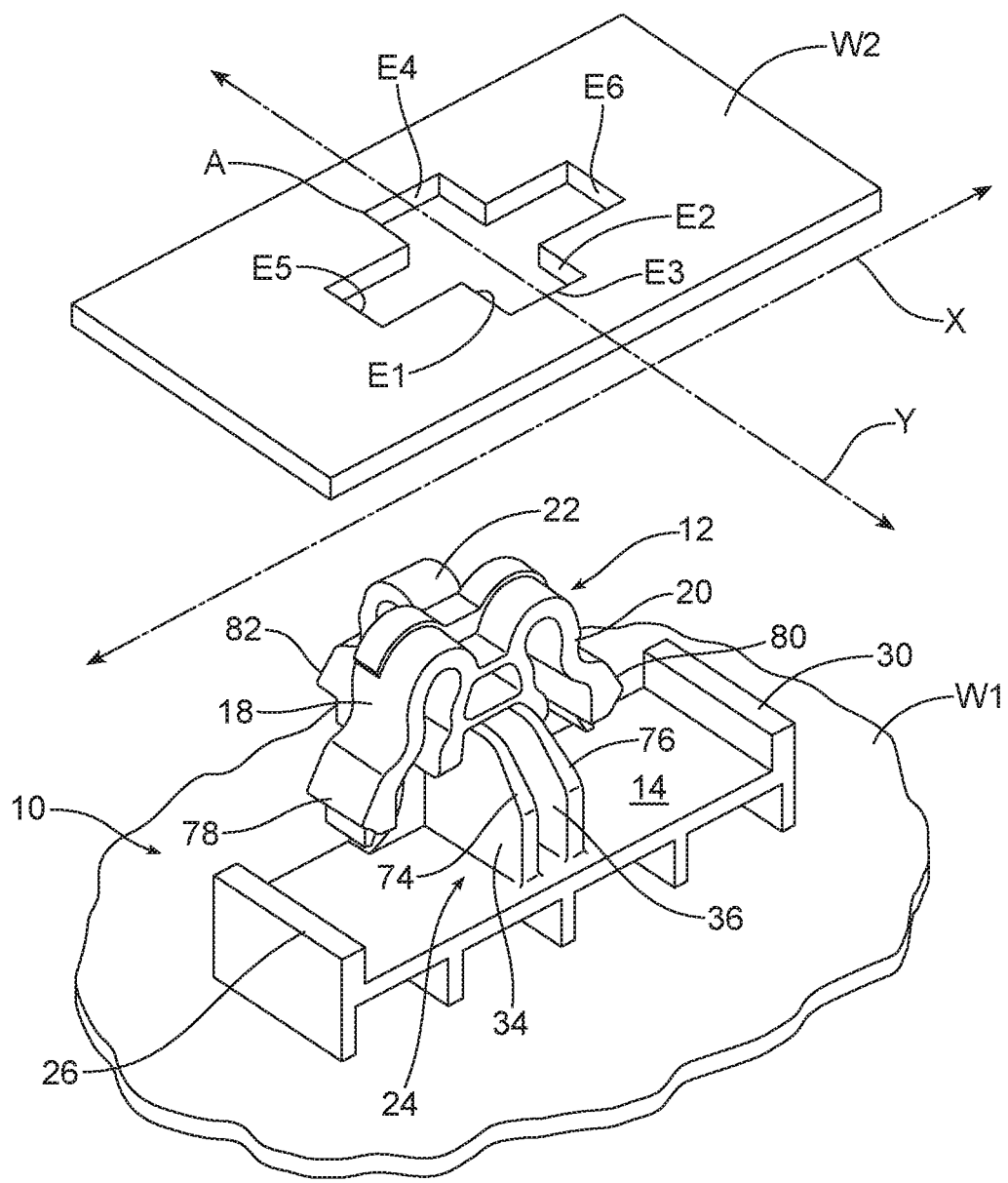
Figure 5B:
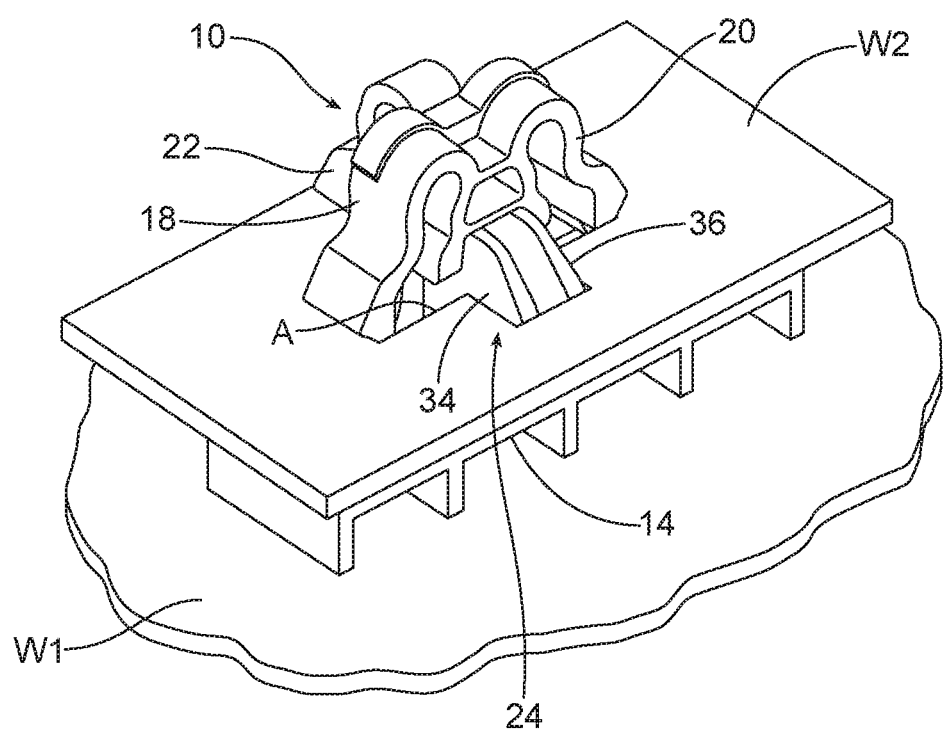

FIGS. 5a and 5b are perspective views illustrating how the spring clip, illustrated in FIGS. 1-4, is utilized to secure a plastic part to a workpiece such as a sheet metal body component. FIG. 5a illustrates how the spring clip on the plastic part is aligned with a receiving aperture in the sheet metal body component. FIG. 5b clearly illustrates the plastic part secured to the sheet metal body component by the spring clip.

Figure 5C:
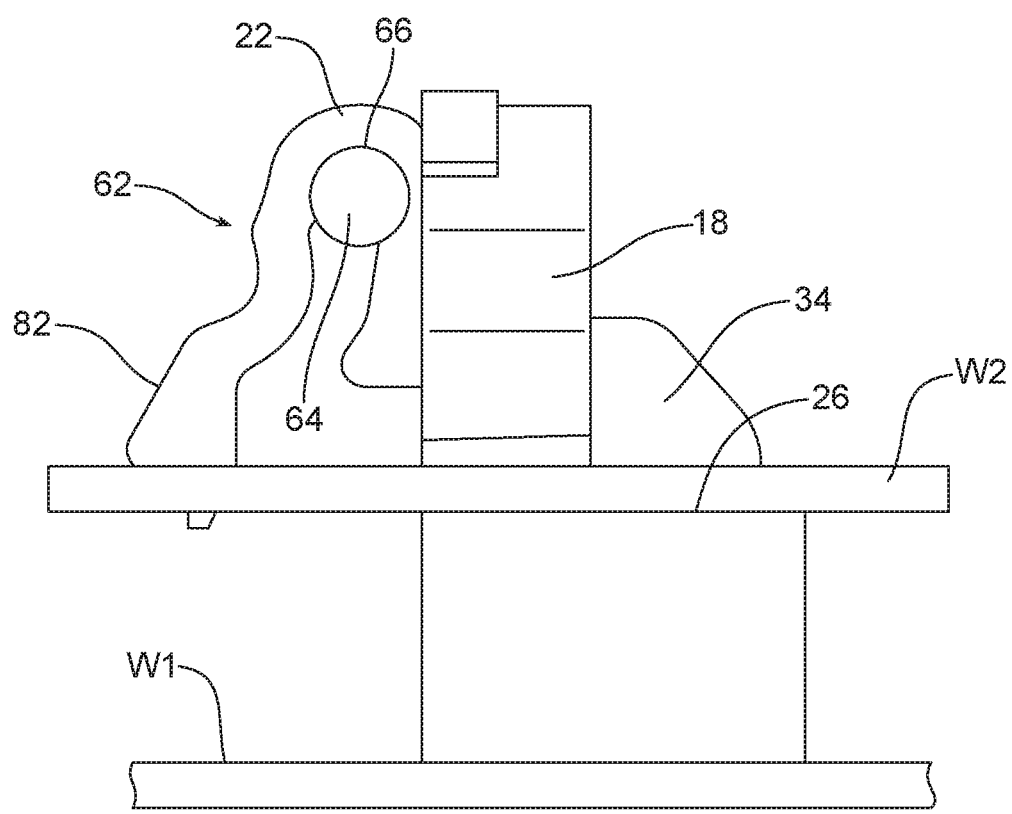

FIG. 5c is a right side elevational view further illustrating how the spring clip is secured in the sheet metal body component when the plastic part including the spring clip is attached to the sheet metal body component.

Reference will now be made in detail to the present preferred embodiment of the spring clip, illustrated in the accompanying drawing figures.

DETAILED DESCRIPTION

Reference is now made to FIGS. 1-4 illustrating the new and improved spring 10. That spring clip 10 includes a body 12 having a base 14 and a support post 16.

A first cantilevered bar 18, a second cantilevered bar 20 and a third cantilevered bar 22 are all carried on the support post 16. Further, a 4-way locator 24 is fixed to the base 14 adjacent the support post 16.

In the illustrated embodiment, the first cantilevered bar 18 is opposed to the second cantilevered bar 20 while the third cantilevered bar 22 is opposed to the 4-way locator 24.

Figure 1:
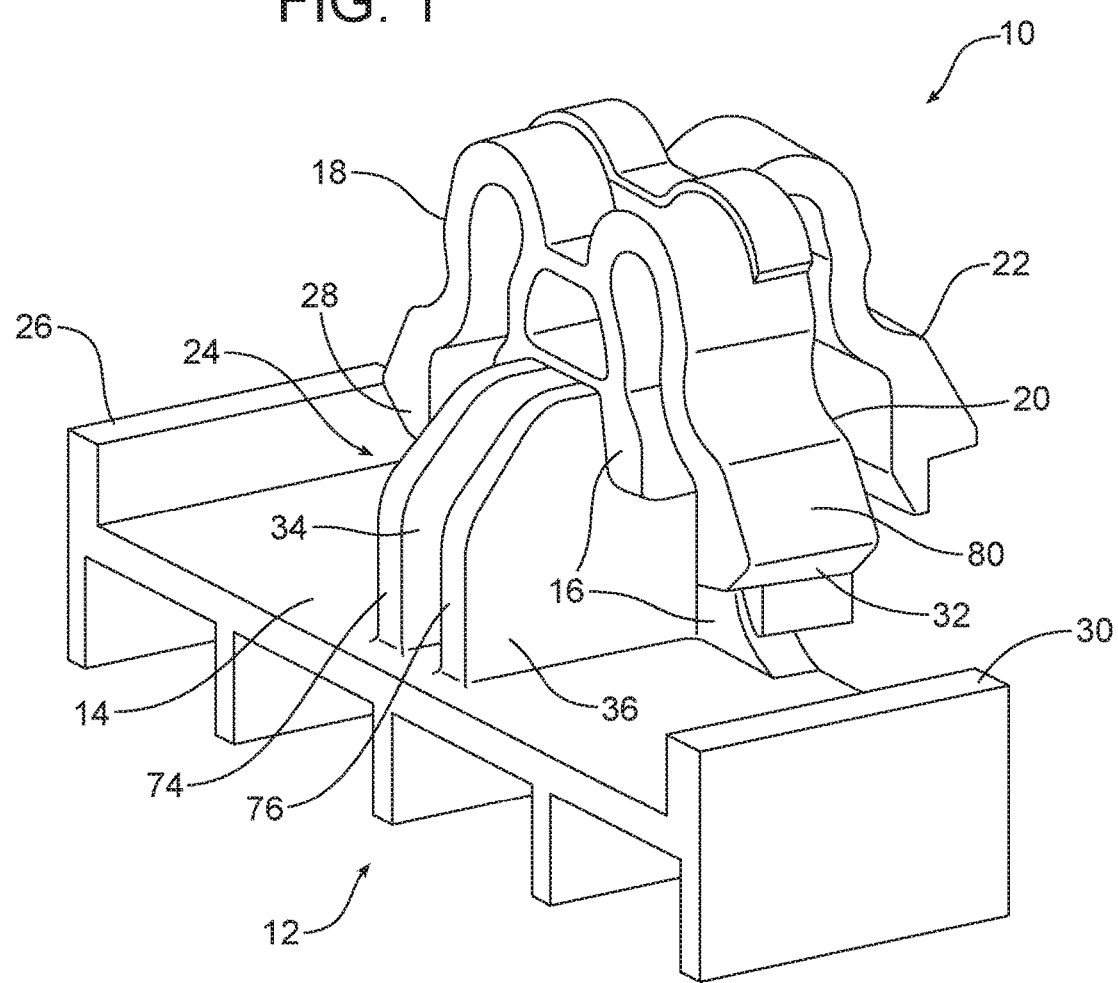
FIG. 1 is a left front perspective view of the spring clip illustrating the base, the 4-way locator and the three cantilevered bars.
Figure 2:
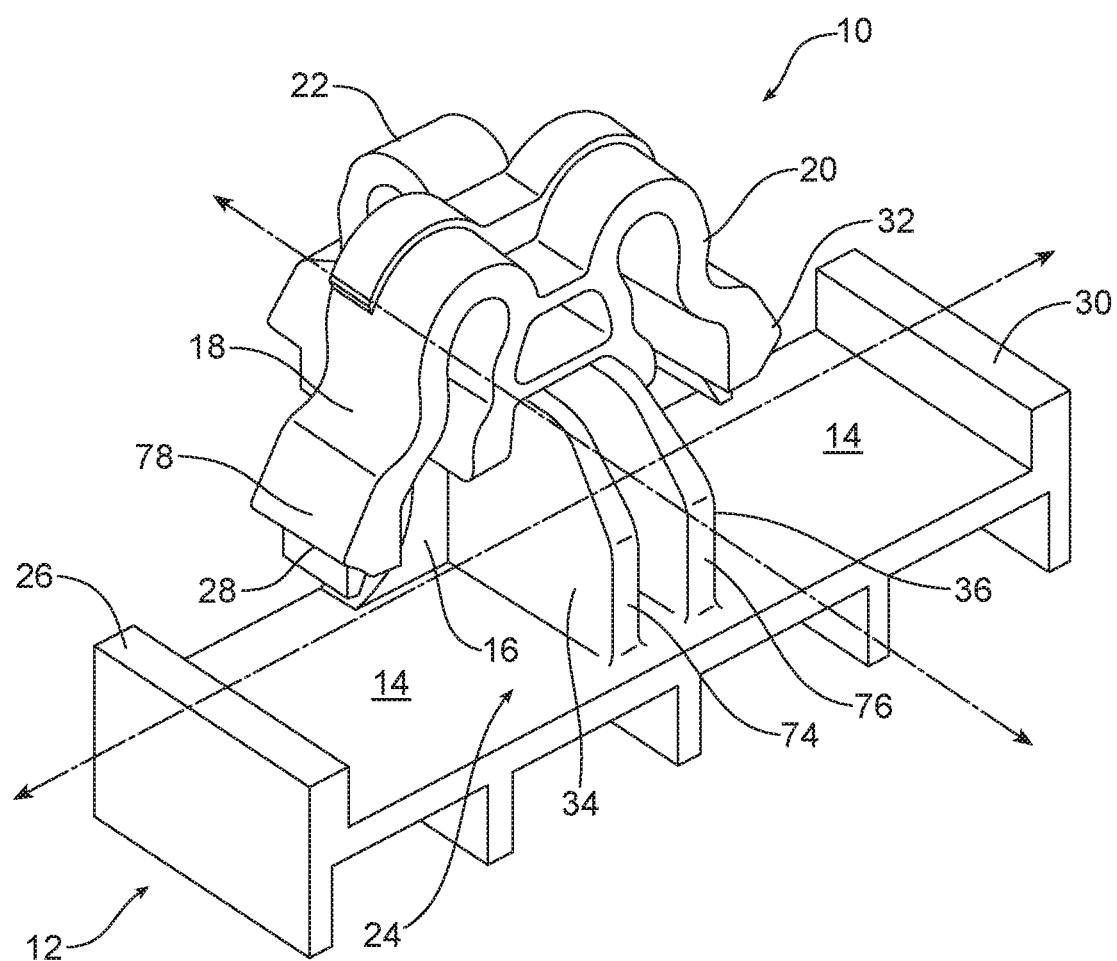
FIG. 2 is a right front perspective view of the spring clip illustrated in FIG. 1.

As best illustrated in FIGS. 1-3, the spring clip 10 further includes a first tunable rib 26 carried on the base at one end adjacent a first distal end 28 of the first cantilevered bar 18. The spring clip 10 also includes a second tunable rib 30 carried on the base 14 at an opposite end thereof adjacent a second distal end 32 of the second cantilevered bar 20.

As best illustrated in FIGS. 1 and 2, the 4-way locator 24 includes a first beveled tuning rib 34 and a second beveled tuning rib 36. The first beveled tuning rib 34 is parallel to the second beveled tuning rib. The two beveled tuning ribs 34, 36 extend in a direction away from but parallel to the third cantilevered bar 22. One function of the first and second tunable ribs 26, 30 and the first and second beveled tuning ribs 34, 36 is to ensure proper fit and prevent the risk of squeaks and rattles as will be described in greater detail below.

As best illustrated in FIG. 4, the first cantilevered bar 18 includes a first S-curve 42 and a first gusset 44 in the bend 46 connecting the first cantilevered bar 18 to the support post 16. Further, the first distal end 28 of the first cantilevered bar 18 comprises a first double blocked notch 48 having a first midpoint angle 50.

Similarly, as best illustrated in FIG. 4, the second cantilevered bar 20 includes a second S-curve 52. Further, the second cantilevered bar 20 includes a second gusset 54 in the second bend 56 connecting the second cantilevered bar 20 to the support post 16. Further, the second distal end 32 of the second cantilevered bar 20 includes a second double blocked notch 58 having a second midpoint angle 60.

As best illustrated in FIGS. 3 and 5c, the third cantilevered bar 22 includes a third S-curve 62 and a third gusset 64 in the third bend 66 connecting the third cantilevered bar 22 to the support post 16. Further, the third cantilevered bar 22 includes a third distal end 68 having a third double blocked notch 70 with a third midpoint angle 72.

Reference is now made to FIGS. 5a-5c illustrating one possible embodiment wherein the spring clip 10 is integrally molded as a part of a plastic workpiece W1. When one wishes to connected the plastic workpiece W1 to the sheet metal component W2, one aligns the top of the body 12 with the cross-shaped mounting aperture A in the sheet metal component. As the spring clip 10 is inserted into the mounting aperture A, the 4-way locator 24 ensures proper alignment and orientation of the plastic workpiece W1 with the sheet metal component W2. More specifically, the first beveled tuning rib 34 and the second beveled tuning rib 36 engage the edges E1, E2 of the aperture A ensuring proper orientation along the X axis. At the same time, the first beveled edge 74 of the first beveled tuning rib 34 and the second beveled edge 76 of the second beveled tuning rib 36 engage the edge E3 of the aperture A. Simultaneously the first cantilevered bar 18 engages the edge E5 of the aperture A, the second cantilevered bar 20 engages the edge E6 of the aperture A and the third cantilevered bar 22 engages the edge E4 of the aperture A. This ensures proper orientation of the spring clip 10 along the Y axis thereby providing full 4-way locator function.

As the spring clip 10 is further inserted into the aperture A, the cam surface 78 of the first cantilevered bar 18 engages the edge E5 of the aperture A while the cam surface 80 of the second cantilevered bar 20 engages the edge E6 of the aperture A and the cam surface 82 engages the edge E4 of the aperture A. This causes the resilient first cantilevered bar 18, the resilient second cantilevered bar 20 and the resilient third cantilevered bar 22 to all flex about their respective first bend 46, second bend 56 and third bend 66 and pivot inwardly toward the support post 16. Just as the distal edges of the first and second tunable ribs 26, 30 come into contact with the face of the sheet metal component W2, the cam surfaces 78, 80, 82 clear the sheet metal component W2 and the first, second and third cantilevered bars 18, 20, 22 spring outwardly away from the support post 16 about the respective first, second and third bends 46, 56, 66 with the spring clip 10 now fully seated in the aperture A of the sheet metal component.

As should be appreciated, in this fully seated position illustrated in FIG. 5b and FIG. 5c, the margin of the sheet metal component W2 provided around the aperture A is effectively captured in the first double blocked notch 48 of the first cantilevered bar 18, the second double blocked notch 58 of the second cantilevered bar 20 and the third double blocked notch 70 of the third cantilevered bar 22. Here it should be appreciated that the height of the tunable ribs 26, 30, and the length and spacing of the beveled tuning ribs 34, 36 may be adjusted or tuned in order to provide a good, rattle-free connection between the workpiece W1 and the sheet metal component W2.

Should it ever become necessary to disconnect the workpiece W1 from the sheet metal component W2 for service or any other reason, it is possible to pry the workpiece W1 away from the sheet metal component W2 and overcome the resilient holding power of the spring clip 10. When this is done, the edges E4, E5 and E6 of the mounting aperture A slide up the radiused faces of the respective double blocked notches 70, 48, 58 causing the cantilevered bars 18, 20, 22 to bend slightly inward toward the support post 16 until the aperture is free of the notches to allow easy separation. During disassembly, the 4-way locator 24 prevents the breakage of the cantilevered bars 18, 20, 22 and ensures that the cantilevered bars always work in a normal direction to any load applied to the spring clip 10.

Numerous benefits are provided by the unique and novel structure of the spring clip 10. As should be appreciated, the first bend 46, second bend 56 and third bend 66 of the respective first, second and third cantilevered bars 18, 20, 22 function to distribute stress in the juncture of the cantilevered bars to the support post 16. As a consequence, the stress generated during assembly and disassembly is maintained below the yield strength of the material. Here it should also be appreciated that the first S-curve 42, second S-curve 52 and third S-curve 62 in the first, second and third cantilevered bars 18, 20, 22 redirects forces generated by the action of disassembly towards the center creating a spring effect. At the same time, the double blocked notches 48, 58 and 70 at the distal ends 28, 32, 68 of the cantilevered bars 18, 20, 22 tend to promote proper inward bending of the cantilevered bars and consequently prevent buckling. Further, the first, second and third gussets 44, 54, 64 of the first, second and third cantilevered bars 18, 20, 22 help to dissipate stress and distribute that stress in a more effective manner.

It should also be appreciated that the first, second and third cantilevered bars 18, 20, 22 operate in conjunction with the 4-way locator 24 to not only provide an effective attachment between the two workpieces W1 and W2 equivalent to heat stake welding but they virtually eliminate the risk of squeak and rattle. All this is achieved while advantageously reducing the additional assembly operation and manpower costs associated with heat stake welding.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A spring clip, comprising:
a body having (a) a base, (b) a support post carried on said base, (c) a first cantilevered bar carried on said support post, (d) a second cantilevered bar carried on said support post, (e) a third cantilevered bar carried on said support post, and (f) a 4-way locator fixed to said base adjacent said support post, wherein said third cantilevered bar is opposed to said 4-way locator.

2. The spring clip of claim 1, wherein said first cantilevered bar is opposed to said second cantilevered bar.

3. The spring clip of claim 2, further including a first tunable rib carried on said base adjacent a first distal end of said first cantilevered bar and a second tunable rib carried on said base adjacent a second distal end of said second cantilevered bar.

4. The spring clip of claim 3, wherein said first distal end includes a first double blocked notch.

5. The spring clip of claim 4, wherein said second distal end includes a second double blocked notch.

6. The spring clip of claim 5, wherein said third cantilevered bar includes a third distal end having a third double blocked notch.

7. The spring clip of claim 6, wherein said first cantilevered bar includes a first S-curve.

8. The spring clip of claim 7, wherein said second cantilevered bar includes a second S-curve.

9. The spring clip of claim 8, wherein said third cantilevered bar includes a third S-curve.

10. The spring clip of claim 9, wherein said first cantilevered bar includes a first gusset.

11. The spring clip of claim 10, wherein said second cantilevered bar includes a second gusset.

12. The spring clip of claim 11, wherein said third cantilevered bar includes a third gusset.

13. The spring clip of claim 12, wherein said 4-way locator includes a first beveled tuning rib.

14. The spring clip of claim 13, wherein said 4-way locator includes a second beveled tuning rib.

15. The spring clip of claim 14, wherein said first beveled tuning rib is parallel to said second beveled tuning rib.

16. The spring clip of claim 15, wherein said first double blocked notch includes a first midpoint angle, said second double blocked notch includes a second midpoint angle and said third double blocked notch includes a third midpoint angle.

17. A spring clip, comprising:
a body having (a) a base, (b) a support post carried on said base, (c) a first cantilevered bar carried on said support post, (d) a second cantilevered bar carried on said support post, (e) a third cantilevered bar carried on said support post, and (f) a 4-way locator fixed to said base adjacent said support post, wherein said 4-way locator includes a first and a second beveled tuning rib.

18. The spring clip of claim 17, wherein said first beveled tuning rib is parallel to said second beveled tuning rib.

19. A spring clip, comprising:
a body having (a) a base, (b) a support post carried on said base, (c) a first cantilevered bar carried on said support post, (d) a second cantilevered bar carried on said support post, (e) a third cantilevered bar carried on said support post, and (f) a 4-way locator fixed to said base adjacent said support post, wherein said third cantilevered bar is perpendicular to the first and second cantilevered bars.

* * * * *